United States Patent
Hosono et al.

[11] Patent Number: 5,414,204
[45] Date of Patent: May 9, 1995

[54] METHOD OF TREATING REFRACTORY ACTIVATED CARBON BY EXPOSURE TO IONIZING RADIATION

[75] Inventors: Masakazu Hosono, Gunma; Hidehiko Arai, Saitama; Teijiro Miyata, Gunma, all of Japan

[73] Assignee: Japan Atomic Energy Research Institute, Tokyo, Japan

[21] Appl. No.: 158,816

[22] Filed: Nov. 29, 1993

Related U.S. Application Data

[63] Continuation of Ser. No. 933,738, Aug. 24, 1992.

[30] Foreign Application Priority Data

Aug. 23, 1991 [JP] Japan ................... 3-211957

[51] Int. Cl.$^6$ ............ B09B 3/00; B01J 19/12; B01J 20/34; B01J 37/34
[52] U.S. Cl. ............................. 588/210; 502/5; 588/212
[58] Field of Search ........... 502/22, 23, 522, 5; 588/210, 212, 227

[56] References Cited

U.S. PATENT DOCUMENTS

| | | | |
|---|---|---|---|
| 3,846,296 | 11/1974 | Hay | 502/5 |
| 5,087,384 | 2/1992 | Ding | 502/53 |
| 5,087,394 | 2/1992 | Ding | 502/23 |

FOREIGN PATENT DOCUMENTS

| | | | |
|---|---|---|---|
| 4-279178 | 10/1992 | Japan | 588/210 |
| 5-49927 | 3/1993 | Japan | 588/210 |

OTHER PUBLICATIONS

Peter Gehringer et al., "Radiation-induced Decomposition of Aqueous Trichloroethylene Solutions", pp. 1227-1231, Appl. Radict. Isot., vol. 12, 1988.

*Primary Examiner*—Paul E. Konopka
*Attorney, Agent, or Firm*—Banner, Birch, McKie and Beckett

[57] ABSTRACT

The improved method of treating activated carbon having an organochlorine compound adsorbed thereon which comprises adding water to said activated carbon and then exposing said activated carbon to ionizing radiation, thereby decomposing and rendering harmless the organochlorine compound adsorbed on the activated carbon is described. The method is capable of safe and efficient decomposition of the activated carbon that has been used in adsorption treatment of organochlorine compounds such as PCBs and trichloroethylene that have heretofore been difficult to treat. The activated carbon that has hitherto simply been accumulated to date after adsorbing organochlorine compounds can be effectively treated by the method at low cost.

14 Claims, 1 Drawing Sheet

METHOD OF TREATING REFRACTORY ACTIVATED CARBON BY EXPOSURE TO IONIZING RADIATION

This application is a continuation of application Ser. No. 07/933,738 filed Aug. 24, 1992.

This application claims the priority of Japanese Patent Application No. 3-211957 filed Aug. 23, 1991.

BACKGROUND OF THE INVENTION

This invention relates to a method of safely and efficiently treating activated carbon which has adsorbed thereon trichloroethylene, tetrachloroethylene, dioxin, PCBs, o-chlorophenol and other organochlorine compounds that are difficult to treat by known chemical or physical means.

There have been available no effective methods for treating organochlorine compounds such as dioxin and PCBs and the only method presently employed is such as to prevent their diffusion by effecting adsorption on activated carbon or some other suitable adsorbent. For example, in order to remove toxic materials such as trichloroetylene that are present in very small amounts in the ppb order in underground water, the water is aerated to enable dissolved trichloroethylene and other toxic materials to be adsorbed on activated carbon.

Conventionally, activated carbon having toxic materials adsorbed thereon is either stored or appropriately treated by incineration or heating in steam. However, the following problems arise with such methods. First, burning in an incinerator involves the possibility that organochlorine compounds adsorbed on activated carbon may be released into the atmosphere. Further, pyrolysis of organochlorine compounds may also result in toxic by-products, such as chlorine gas, phosgene and dioxin being released into the atmosphere in the form of secondary pollution. In addition, the heating of organochlorine compounds with steam yields chlorine gas which is corrosive and the affects walls of a heating furnace (regenerator), in which it is generated, thereby considerably shortening the furnace life.

In both incineration and steam heating, the organic material recombines with chlorine to produce dioxin and other toxic by-products if the treatment temperature is too low. To avoid this problem, it is necessary to reburn the exhaust gas at temperatures higher than 1000° C. which substantially increases the cost of treatment.

Even if organochlorine compounds are exposed to ionizing radiation in a vapor phase, chlorine gas will be produced and may be released into the atmosphere.

SUMMARY OF THE INVENTION

The present invention has been accomplished under these circumstances and has an object the provision of a method which will enable safe and efficient decomposition of activated carbon that has been used for adsorption treatment of organochlorine compounds such as PCBs and trichloethylene (TCE), and which has heretofore been difficult to treat.

The above stated object of the present invention is attained by a method of treating activated carbon having an organochlorine compound adsorbed thereon, characterized in that water is added to said activated carbon, which is then exposed to ionizing radiation, thereby decomposing and rendering harmless organochlorine compound adsorbed on the activated carbon.

DETAILED DESCRIPTION OF THE INVENTION

Figure 1:
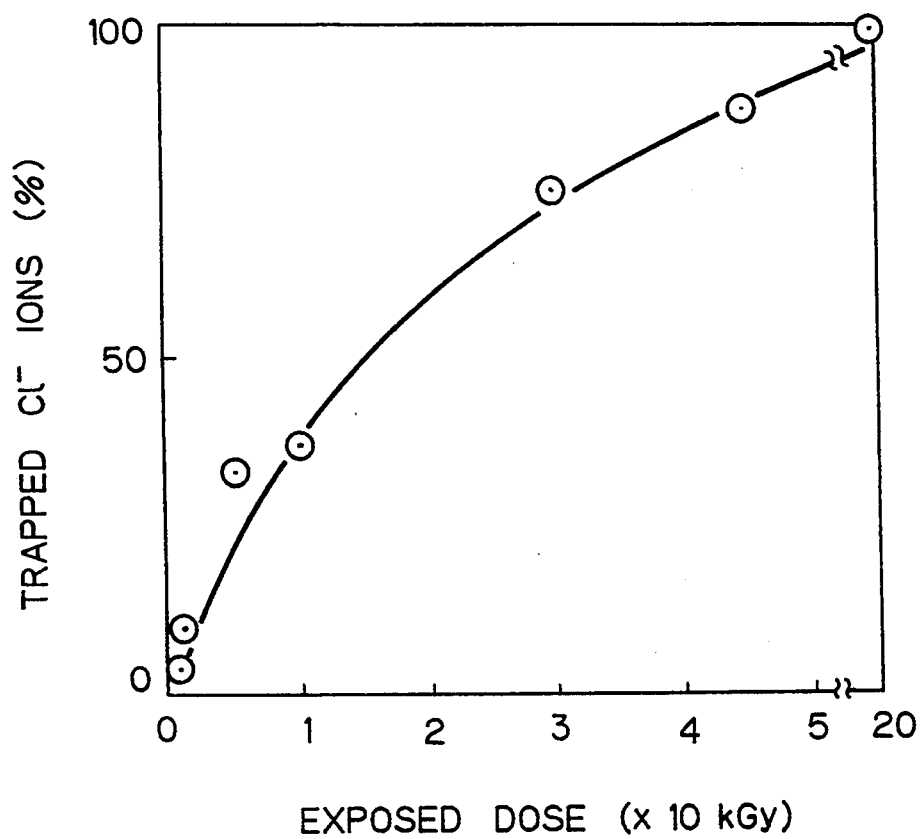
FIG. 1 is a graph illustrating decomposition by irradiation of trichloroethylene that was adsorbed on fibrous activated carbon.

Upon exposure to ionizing radiation, the organochlorine compound adsorbed on activated carbon is decomposed to generate chloride ions. The generated chloride ions are trapped in the added water and thus are not released into the atmosphere. The added water becomes slightly acidic but can be readily neutralized by a simple and safe alkali treatment.

Unlike the conventional methods of incineration and heating with steam, decomposition by exposure to ionizing radiation does not require high temperatures, consequently, this method is highly energy efficient and, as such, is advantageous from an economic viewpoint.

Thus, the method of the present invention which utilizes ionizing radiation ensures that activated carbon having organohalogen compounds adsorbed thereon and which have heretofore been held practically impossible to treat, can be treated in a safe and efficient manner.

In the foregoing method, water is added to the activated carbon which has an organochlorine compound adsorbed thereon and, thereafter, the activated carbon is exposed to ionizing radiation, whereby the organochlorine compound adsorbed on the activated carbon is decomposed and, at the same time, the product of decomposition is trapped in the water thus preventing it from being diffused in the latter.

This is made possible by the existence of two different reactions: in one reaction, the organochlorine compound is directly decomposed by exposure to ionizing radiation and the chloride ions which are the product of decomposition are trapped in the added water; in the other reaction, active species such as hydroxy radicals and hydrated electrons are generated in the added water upon exposure to ionizing radiation and they attach the C–Cl bonds in the organochlorine compound to generate chloride ions, which are then trapped in the water. In both reactions, the organochlorine compound is decomposed with high efficiency.

The residual organic compound remaining after dissociation of chlorine by exposure to ionizing radiation reacts with oxygen dissolved in the added water under the action of the ionizing radiation or the active species mentioned in the preceding paragraph and, eventually, it is completely broken up into carbon dioxide gas and water this oxidative reaction proceeds only partially, organic acids such as oxalic acid and acetic acid will form, causing the added water to become slightly acidic. However, these acids can be neutralized and rendered harmless by the addition of an aqueous solution of all alkali such as sodium hydroxide or potassium hydroxide.

In the method of the present invention, water is preferably added in the smallest possible amount. In one embodiment of the present invention, water is added to the activated carbon in such a manner that the surface of the activated carbon substantially becomes wet. The process in which an organochlorine compound present in a very small amount in underground water is adsorbed on activated carbon may well be regarded as concentrating the organochlorine compound and the effect of this concentration is lost if water is added in a large amount. Furthermore, if water is added in a large amount, the efficiency of decomposition of the organochlorine compound by exposure to an ionizing radiation decreases. This is undesirable from the viewpoint of energy efficiency. However, if the amount of added water is too small, chloride ions that have formed as a result of decomposition of the oarganochlorine compound can no longer be trapped in the added water and may partly be released into the atmosphere. Therefore, the minimum amount of water to be added must be determined relative to the amount of the organchlorine compound to be treated. In one embodiment of the present invention, an amount of water to be added does not exceed the apparent (bulk) volume of the activated carbon to be treated by more than about 1500 times, preferably about 1000 times, more preferably 100 times and most preferably about 10 times. In another embodiment of the present invention, an amount of water to be added to the activated carbon is substantially the same as the apparent volume of the activated carbon.

The organochlorine compound to be treated by the method of the present invention means any of the chlorine-containing organic compounds, which may additionally contain oxygen, nitrogen, etc. Examples of such organochlorine compounds include trichloroethylene, tetrachloroethylene, dioxin, PCBs, o-chlorophenol and organochlorine agrichemicals.

The activated carbon employable in the method of treatment of the present invention is not limited to that having a particular nature or morphology and any type of activated carbon may be employed. Fiberous activated carbon is preferred.

The ionizing radiation that can be used in the method of treatment of the present invention include α-rays, β-rays, γ-rays, accelerated electron beams, X-rays and ultraviolet rays. In practical applications, γ-rays or accelerated electron beams are preferably used. As described in the examples that follow, the dose of exposure of ionizing radiation must be determined in relative terms since it varies with the type and amount of the organochlorine compound to be decomposed. As will be apparent from FIG. 1 showing the result of Example 1, the organochlorine compound is completely decomposed if it is exposed to a predetermined dose of ionizing radiation and, hence, use of a higher dose of ionizing radiation is not preferable from the viewpoint of energy efficiency.

As will be understood from the examples described below, the method of the present invention has a very high practical value for use in the treatment of activated carbon having an organochlorine compound adsorbed thereon. It should, however, be noted that the method is also applicable to the case of treating organohalogen compounds other than organochlorine compounds.

The activated carbon treated by the method of the present invention after adsorbing organochlorine compounds can be regenerated for further use by a subsequent treatment of activation on the condition that it is not subjected to any chemical modifications.

The following examples are provided for the purpose of further illustrating the present invention but are in no way to be taken as limiting.

EXAMPLE 1

Trichloroethylene was adsorbed on fibrous activated carbon in an amount of 815 mg per gram of the carbon by vapor-phase adsorption. A portion (20 mg) of this activated carbon was taken in a conical flask with a ground-in stopper. Water (50 g) was added to the activated carbon, which was exposed to γ-rays from cobalt 60.

FIG. 1 is a graph showing the concentration profile of chloride ions that were generated in the added water during exposure to γ-rays. As is clear from FIG. 1, the increase in the exposed dose of γ-rays was accompanied by the increase in the concentration of chloride ions, leading to continued decomposition of trichloroethylkene. At the exposed dose of 200 kGy, the trichloroethylene adsorbed on the activated carbon was decomposed almost completely to be dissolved as chloride ions in the water. In the meantime, no toxic gases were detected and the trichloroethylene could be rendered harmless in a safe and efficient manner.

The resulting aqueous solution exhibited acidic nature (pH≈3) but it could be readily neutralized by addition of an aqueous solution of sodium hydroxide.

EXAMPLE 2

Tetrachloroethylene was adsorbed on fibrous activated carbon in an amount of 0.8 g per gram of the carbon by vaporphase adsorption. A portion (20 mg) of this activated carbon was taken in a conical flask with a ground-in stopper and decomposed by the same procedure as in Example 1. The dose of γ-rays necessary to decompose tetrachloroethylene completely was about 1.5 times (i.e., ca. 350 kGy) the value for trichloroethylene. While several reasons can be put forward to explain this phenomenon, the major reason would be that tetrachloroethylene contains more chlorine atoms than trichloroethylene. In the meantime, no toxic gases were detected and tetrachloroethylene could be rendered harmless in a safe and efficient manner.

EXAMPLE 3

O-chlorophenol was adsorbed on fibrous activated carbon in an amount of 1.0 g per gram of the carbon by vapor-phase adsorption. A portion (50 mg) of this activated carbon was take in a conical flask with a ground-in stopper. Water (100 g) was added to the activated carbon, which was exposed to Y-rays from cobalt 60.

During the exposure to γ-rays, the concentration of chloride ions generated in the added water as a result of decomposition of o-chlorophenol was measured and plotted against the exposed dose of γ-rays. The concentration of chloride ions increased with the exposed dose of γ-rays. At the exposed dose of 400 kGy, the o-chlorophenol was decomposed almost completely to be dissolved as chloride ions in the water. In the meantime, nothing like deleterious gases were detected.

As described on the foregoing pages, the present invention enables a safe and efficient treatment of activated carbon that has organohalogen compounds adsorbed thereon and that have heretofore been difficult to treat. Thus, the activated carbon that has simply been accumulated to date after adsorbing organohalogen compounds can be effectively treated by the method of the present invention at low cost.

What is claimed is:

1. A method of decomposing an organochlorine compound adsorbed on an activated carbon, said organochlorine compound being selected from the group consisting of dioxin, PCBs, chlorophenol and organochlorine agrichemicals, said method comprising the steps of:

adding water to the activated carbon having the organochlorine compound adsorbed thereon in such a manner that the amount of water to be added is at least substantially the same as the apparent volume of the activated carbon but does not exceed the apparent volume of the activated carbon by more than about 100 times; and exposing the activated carbon to ionizing radiation, thereby decomposing and rendering harmless the organochlorine compound adsorbed on the activated carbon.

2. The method according to claim 1 wherein the ionizing radiation is $\alpha$-rays, $\beta$-rays, $\gamma$-rays, accelerated electron beam, x-rays, or ultraviolet rays.

3. The method according to claim 2 wherein the ionizing radiation is $\gamma$-rays or accelerated electron beam.

4. The method according to claim 1 wherein the activated carbon is fibrous.

5. The method according to claim 1 wherein an amount of water to be added does not exceed the apparent volume of the activated carbon by more than about 10 times.

6. The method of claim 1 wherein the amount of water to be added is substantially the same as the apparent volume of the activated carbon.

7. The method of claim 1 wherein following exposure to said ionizing radiation an aqueous solution of an alkali is added.

8. The method of claim 7 wherein said aqueous solution of an alkali is sodium hydroxide or potassium hydroxide.

9. The method of claim 1 wherein said organochlorine compound is an organochlorine agrochemical.

10. The method of claim 9 wherein said organochlorine agrochemical is trichloroethylene.

11. The method of claim 9 wherein said organochlorine agrochemical is tetrachloroethylene.

12. The method of claim 1 wherein said organochlorine compound is dioxin.

13. The method of claim 1 wherein said organochlorine compound is a PCB.

14. The method of claim 1 wherein said organochlorine compound is o-chlorophenol.

* * * * *